US012646796B2

(12) United States Patent　　(10) Patent No.:　US 12,646,796 B2

Dick et al.　　(45) Date of Patent:　Jun. 2, 2026

(54) CELL CONTACTING SYSTEM, AND ENERGY STORAGE DEVICE

(71) Applicants:Diehl AKO Stiftung & Co. KG, Wangen (DE); Diehl Advanced Mobility GmbH, Zehdenick (DE)

(72) Inventors: Artur Dick, Strausberg (DE); Kian Mahdjour, Berlin (DE); Silke Abreder, Sauldorf (DE); Artur Schütz, Wangen (DE); David Jäger, Lindenberg (DE); Bernhard Lutz, Wangen (DE); Ingo Weber, Potsdam (DE); Tejas Harish Navsariwala, Berlin (DE); Markus Kohler, Nuremberg (DE); Mateusz Kurpiel, Wangen (DE)

(73) Assignees: Diehl AKO Stiftung & Co. KG, Wangen (DE); Diehl Advanced Mobility GmbH, Zehdenick (DE)

( * ) Notice: Subject to any disclaimer, the term of this patent is extended or adjusted under 35 U.S.C. 154(b) by 793 days.

(21) Appl. No.: 17/941,195

(22) Filed: Sep. 9, 2022

(65) Prior Publication Data

US 2023/0402705 A1　　Dec. 14, 2023

(30) Foreign Application Priority Data

Jun. 10, 2022　(DE) ..................... 10 2022 114 653.7

(51) Int. Cl.
　*H01M 50/375*　(2021.01)
　*H01M 10/613*　(2014.01)
　*H01M 10/6556*　(2014.01)

(52) U.S. Cl.
　CPC ....... *H01M 50/375* (2021.01); *H01M 10/613* (2015.04); *H01M 10/6556* (2015.04); *H01M 2220/20* (2013.01)

(58) Field of Classification Search
　CPC ............ H01M 50/375; H01M 10/613; H01M 10/6556; H01M 2220/20; H01M 10/486;
　　　　　(Continued)

(56) References Cited

U.S. PATENT DOCUMENTS 11,127,990 B2　9/2021　Hammerschmied et al.
2010/0136392 A1　6/2010　Pulliam et al.
(Continued)

FOREIGN PATENT DOCUMENTS

DE　　2008304295 A　12/2008
DE　102007063178 A1　6/2009
(Continued)

*Primary Examiner* — Adam A Arciero
(74) *Attorney, Agent, or Firm* — Laurence A. Greenberg; Werner H. Stemer; Ralph E. Locher

(57) ABSTRACT

A cell contacting system is provided for energy storage cells of an energy storage device, in particular an energy storage device for a vehicle. The system contains a plurality of cell connectors for electrically contacting pole contacts of the energy storage cells, at least one degassing channel for discharging gases escaping from the energy storage cells, at least one temperature control channel for conducting a fluid for controlling the temperature of the energy storage cells and/or the cell connectors, and open-loop and/or closed-loop control electronics for open-loop and/or closed-loop control of the energy storage cells of the energy storage device.

20 Claims, 14 Drawing Sheets

(58) Field of Classification Search
CPC ............. H01M 50/358; H01M 50/519; H01M 10/6553; H01M 10/625; H01M 50/507; H01M 50/569; B60L 2240/545; B60L 2270/12; B60L 3/0046; B60L 58/26; B60L 58/10; B60L 50/64
See application file for complete search history.

(56) References Cited

U.S. PATENT DOCUMENTS

| | | | |
|---|---|---|---|
| 2011/0101920 A1* | 5/2011 | Seo | H02J 7/005 429/61 |
| 2013/0059175 A1 | 3/2013 | Engel et al. | |
| 2016/0056514 A1* | 2/2016 | Ahn | H01M 50/567 429/120 |
| 2016/0254515 A1* | 9/2016 | Shimoda | H01M 50/262 429/61 |
| 2017/0077566 A1* | 3/2017 | Mascianica | H01M 10/6556 |
| 2019/0081309 A1* | 3/2019 | Capati | H01M 50/213 |
| 2021/0167346 A1 | 6/2021 | Kwag | |

FOREIGN PATENT DOCUMENTS

| | | | | |
|---|---|---|---|---|
| DE | 102009046385 A1 | 5/2011 | | |
| DE | 102012219784 A1 | 4/2014 | | |
| DE | 102020135026 B3 | 5/2022 | | |
| EP | 3316384 A1 | 5/2018 | | |
| EP | 3660945 A1 * | 6/2020 | .......... | H01M 50/227 |
| EP | 3660945 B1 | 12/2022 | | |
| JP | 2008304295 A | 12/2008 | | |
| WO | 2022008080 A1 | 1/2022 | | |

* cited by examiner

CELL CONTACTING SYSTEM, AND ENERGY STORAGE DEVICE

CROSS-REFERENCE TO RELATED APPLICATION

This application claims the priority, under 35 U.S.C. § 119, of German Patent Application DE 10 2022 114 653.7, filed Jun. 10, 2022; the prior application is herewith incorporated by reference in its entirety.

FIELD AND BACKGROUND OF THE INVENTION

The present invention relates to a cell contacting system, and an energy storage device, in particular an energy storage device for the automotive sector, using a cell contacting system.

A central point in the development of electrically powered means of transport, for example electric vehicles, is energy storage. This requires energy storage devices with a high-power density and energy density. Energy storage devices regularly consist of a plurality of individual energy storage cells (for example lithium-ion battery cells) that are electrically connected to each other. Energy storage devices usually require temperature management to ensure their operation in an optimized temperature range. The energy storage cells usually have a narrow operating temperature range (for example between +15° C. and +45° C.). The functional safety, service life and cycle stability of the energy storage cell and thus also the functional safety of the entire energy storage device depend significantly on the energy storage cell not leaving this range. If the temperature exceeds a critical level, a so called "thermal runaway" occurs. In the case of thermal runaway, an unstoppable chain reaction is set in motion. The temperature rises extremely within milliseconds and the energy stored in the energy storage cell is released suddenly. In this way, temperatures of over 1,000° C. can occur. The contents of the energy storage device become gaseous and a fire occurs that is difficult to extinguish by conventional means. The danger of a thermal runaway starts at a certain temperature (for example 60° C.) and becomes extremely critical at a further temperature threshold (for example 100° C.). As a result, energy storage devices, especially energy storage devices for electric vehicles, use an energy storage device management system that not only provides open loop or closed loop control of the charging and discharging behavior of the energy storage cells, but also takes measures with regard to temperature management and emergency management in the event of a thermal runaway. In order to ensure a targeted escape of gases in the event of a thermal runaway, the gas tightly sealed energy storage cells can have degassing openings. The degassing openings can, for example, be configured as predetermined breaking points which allow gases to escape from the interior of the energy storage cell to the surrounding environment above a certain internal pressure. The escaping gases may contain electrolytes that can react with water to form hydrofluoric acid. To reduce the danger to surrounding components and/or individuals, such gases must be discharged in a controlled and targeted manner.

For the electrical connection of the energy storage cells, energy storage devices have so called cell connectors that electrically connect two or more poles of two or more energy storage cells, depending on the circuit type. In a series circuit, for example, the anode of one energy storage cell is connected to the cathode of another energy storage cell. In order to be able to monitor and control the state of charge of each energy storage cell, each cell connector can be electrically connected to the open loop and/or closed loop control electronics of the energy storage device. This allows the cell voltage of each individual energy storage cell to be measured and the state of charge of each particular energy storage cell to be deduced via the cell voltage. Furthermore, sensors, for example temperature sensors for monitoring the surface temperature of the energy storage cells, can also be provided, which are connected to the open loop and/or closed loop control electronics. In previous solutions, the open loop and/or closed loop control electronics are located in an independent module.

Published, non-prosecuted German patent application DE 10 2007 063 178 A1 discloses a battery with a heat conducting plate for controlling the temperature of the battery. The battery contains a plurality of interconnected individual cells. The heat conducting plate has holes and/or incisions in the region of the poles of the individual cells, through which the poles of the individual cells protrude in or out. The heat conducting plate is arranged between the individual cells and contacting elements placed on the poles. Electrical cell connectors and/or a cell connector circuit board are provided as contacting elements for the electrical connection of the poles of the individual cells. Furthermore, elastic elements and/or contacting elements may be located on the upper side of the heat conducting plate. This sequence of these individual layers must be clamped to the individual cells via screws during the assembly process. The assembly is therefore time consuming.

Published, non-prosecuted German patent application DE 10 2009 046 385 A1 discloses a battery with a degassing system. The degassing system is located on the side opposite the poles of the battery cells. A base plate provided specially for this purpose is provided there, with passages for degassing openings and a collection basin for collecting the gases from the battery cells.

Published, non-prosecuted German patent application DE 10 2012 219 784 A1 discloses a battery module comprising a gas channel, a printed circuit board and a battery module housing which accommodates a plurality of battery cells. The gas channel is formed by a U profile with through openings to the degassing openings of the battery cells and by a printed circuit board closing the U profile on the side facing away from the degassing openings. The printed circuit board thus forms a wall of the gas channel and can come into direct contact with the gas when gas escapes from a gas outlet opening of a battery cell. During assembly, the printed circuit board is attached directly to the busbars. The U profile is not directly connected to the busbars. The disadvantage of this arrangement is that escaping gas can destroy the unprotected circuit board. In this case, open loop and/or closed loop control of the battery module is no longer ensured. Furthermore, no active temperature control of the battery cell surface or of the cell connectors is provided.

Published, European patent application EP 3 316 384 A1, corresponding to U.S. Pat. No. 11,127,990, discloses a circuit board arrangement. A rigid circuit board for open loop and/or closed loop control electronics is provided, to the surface of which there are directly applied cell connectors for connecting the energy storage cells. Due to this direct connection of the cell connectors to the open loop and/or closed loop control electronics, a direct heat transfer from the electrical connections of the energy storage cells to the open loop and/or closed loop control electronics takes place. Such an arrangement leads to unavoidable measurement deviations in the voltage and temperature measurement. Furthermore, a C shaped flexible printed circuit board carrying a temperature sensor element is fixed to the rigid circuit board. The flexible printed circuit board extends through a slot shaped through opening in the rigid circuit board. The construction is complex and costly, both in terms of the production of the individual parts and in terms of final assembly.

SUMMARY OF THE INVENTION

The problem addressed by the present invention is that of providing a novel cell contacting system which simplifies the assembly effort but is nevertheless operationally reliable.

The above problem is solved by the entire teaching of the independent claims. Expedient embodiments of the invention are claimed in the dependent claims.

A cell contacting system for energy storage cells of an energy storage device, in particular an energy storage device for a vehicle, is provided according to the invention. The cell contacting system contains a plurality of preferably cell connectors for electrically contacting pole contacts of the energy storage cells, at least one degassing channel for discharging gases escaping from the energy storage cells, at least one temperature control channel for conducting a fluid for controlling the temperature of the energy storage cells and/or the cell connectors, and open-loop and/or closed-loop control electronics for open-loop and/or closed-loop control of the energy storage cells of the energy storage device. The cell contacting system according to the invention includes both temperature control of the energy storage device, degassing of the energy storage device and also the open-loop and/or closed-loop control electronics for open-loop and/or closed-loop control of the energy storage cells of the energy storage device. The combination of these individual functional components in a common cell contacting system results in simpler, more cost-effective and operationally reliable construction together with simplified assembly.

The fact that the cell contacting system is a module and can be mounted on the energy storage cells of the energy storage device via the cell connectors means that the cell contacting system can be pre-assembled and kept in stock as one unit. As a result, mounting on the energy storage cells is particularly simple and can be performed in one mounting step.

Expediently, a support structure can be provided which contains the at least one degassing channel and the at least one temperature control channel, and the cell connectors can be fixed to the support structure.

In a particularly advantageous embodiment, the at least one degassing channel and the at least one temperature control channel are each molded into the support structure. This ensures simple production and particularly high operational reliability.

The degassing channel is expediently configured to be open on the first side of the support structure.

Furthermore, the support structure can have a wall, the side of the wall opposite the degassing channel serving as a mounting base, for example for the open-loop and/or closed-loop control electronics or the circuit boards thereof.

In an advantageous embodiment, the wall has an offset forming a mounting recess. The open-loop and/or closed-loop control electronics or the circuit boards thereof can thus be mounted recessed in the mounting recess. They are thus protected. At the same time, the installation space is reduced and the mechanical stability of the support structure is increased.

Advantageously, the support structure can have fastening and/or centring means and/or through openings. The fastening and/or centring means can serve for example to fasten and/or center the open-loop and/or closed-loop control electronics or the circuit boards thereof. The through-openings can serve for example to lead through temperature sensor arrangements for detecting the temperature of the energy storage cells and/or to lead through contacting means, for example for an additional circuit board.

The inner side of the degassing channel and/or the underside of the at least one temperature control channel can further have a protective layer.

The protective layer expediently consists of a heat resistant and/or acid resistant material, as a result of which a particular resistance to thermal or chemical influences can be achieved.

In an advantageous embodiment, the at least one temperature control channel can have through openings arranged laterally to its longitudinal axis. The cell connectors and/or a temperature control structure attached to, preferably over-molded on, the cell connectors, preferably consisting of plastic, can be introduced into the temperature control channel through the through-openings. Advantageously, the temperature control structure can be connected, for example be adhesively bonded or welded, to a through-opening. The temperature control structure can tightly seal the through-opening.

The support structure can expediently be formed as a shaped part, preferably as an injection-molded part or as an extruded part.

Advantageously, plastic or aluminum or an aluminum alloy can be provided as the material for the support structure.

Furthermore, a circuit board and/or an additional circuit board containing at least one sensor element can be provided, wherein the circuit board and the additional circuit board are preferably electrically connected to each other via contacting means and the additional circuit board is preferably spaced apart from the circuit board and the spacing between the additional circuit board and the circuit board is bridged by the contacting means.

The main surfaces of the circuit board and the additional circuit board are preferably arranged vertically offset.

In an advantageous embodiment, the at least one sensor element can have a thermally conductive, preferably elastic, contact element via which the sensor element can be contacted with the surface of an energy storage cell. This can ensure thermal contact of the sensor element with the surface of the energy storage cell and prevent a gap. In addition, manufacturing tolerances and/or relative movements of the cell contacting system with respect to the energy storage cells can be compensated for owing to the elasticity of the contact element.

Furthermore, a temperature sensor arrangement containing at least one sensor element can be provided for contacting the energy storage cells of the energy storage device. The at least one sensor element is connected to the circuit board via connections. A shaped housing element is provided which is intended to support the sensor element, and mechanical connection means are provided on the shaped housing element which serve to fix the shaped housing element to the circuit board.

The mechanical connection means expediently allow a snap connection to the circuit board.

In an advantageous embodiment of a temperature sensor arrangement, the shaped housing element can comprise an elastically deflectable spring arm, with which the sensor element in the mounted state can be pressed against the upper side of the energy storage device or the energy storage cell. The sensor element can be pressed against the upper side of the energy storage device with a certain contact pressure by the spring arm, as a result of which thermal contact is ensured. In addition, manufacturing tolerances and/or relative movements of the cell contacting system with respect to the energy storage cells can be compensated for.

In a further advantageous embodiment of a temperature sensor arrangement, the sensor element can be located in a chamber, on the side of which facing away from the connections of the sensor element, there is located a flexible contact element, which is in contact with the sensor element and projects beyond the housing element at its end facing away from the connections of the sensor element. The sensor element can be pressed against the upper side of the energy storage device with a certain contact pressure by the flexible contact element, as a result of which thermal contact is ensured. In addition, manufacturing tolerances and/or relative movements of the cell contacting system with respect to the energy storage cells can be compensated for.

Advantageously, the cell connector can be provided, preferably over-molded, with a temperature control structure preferably consisting of plastic.

In an expedient embodiment, the temperature control structure can comprise a plurality of temperature control ribs, temperature control nubs, temperature control pins and/or temperature control bars. As a result, particularly effective temperature control and/or flow of the temperature control fluid can be achieved as a function of the temperature control fluid surrounding the temperature control structure.

Expediently, the temperature control ribs, temperature control nubs, temperature control pins and/or temperature control bars can be arranged in series with one another, parallel to one another and/or at equal distances from one another for this purpose.

The fact that the temperature control structure consists of a thermally conductive, electrically insulating material, in particular a thermally conductive, electrically insulating plastic, means that particularly good heat transfer and electrical insulation of the cell connector take place.

The cell connectors preferably consist of a flat material with a constant layer thickness, in particular sheet metal.

For additional temperature control of the surface of an energy storage cell, a contact element with a contact face for contacting the surface of the energy storage cell can be provided on the cell connector, wherein the contact element is connected to the temperature control structure.

In an advantageous embodiment, the contact element can be part of the temperature control structure.

In an alternative embodiment, the contact element can be a contact plate, preferably composed of a sheet metal.

According to one embodiment, contact faces for contacting the pole contacts and the contact face of the contact element contacting the upper side of the energy storage cell are positioned with a vertical offset with respect to one another. This allows thermal and electrical contacting of the contact faces of the cell connector to the pole contacts for contacting of the pole contacts to the pole contacts of the energy storage cell and thermal contacting of the contact element to the surface of the energy storage cell.

Expediently, the vertical offset can be formed by at least one bent portion of the contact element.

According to the invention, an energy storage device, in particular an energy storage device for a vehicle, containing a plurality of energy storage cells arranged in a row, is further provided, wherein a cell contacting system is provided on the energy storage device.

Other features which are considered as characteristic for the invention are set forth in the appended claims.

Although the invention is illustrated and described herein as embodied in a cell contacting system, and an energy storage device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
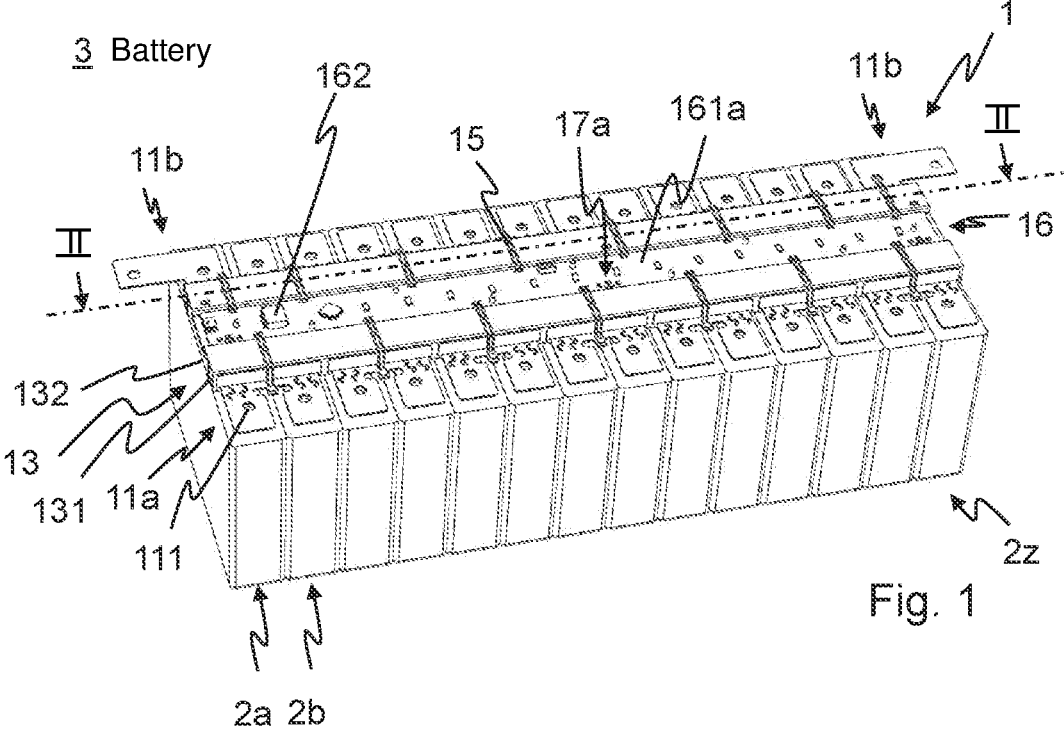
FIG. 1 is a diagrammatic, perspective view of an exemplary embodiment of an energy storage device with a cell contacting system.

Referring now to the figures of the drawings in detail and first, particularly to FIG. 1 thereof, there is shown an energy storage device 3 in its entirety. This is in particular a battery, for example for an electric vehicle with an electric drive. The energy storage device 3 has a plurality of energy storage cells 2a, 2b, 2z connected in series. Reference numeral 1 denotes an example of a cell contacting system which is intended for electrically connecting the individual energy storage cells 2a, 2b, 2z to one another.

The energy storage cells 2a, 2b, 2z each have two pole contacts 22a, 22b (of which only one pole contact 22a can be seen in FIG. 2), specifically one pole contact 22a for an anode and one pole contact 22b for a cathode. The pole contacts 22a, 22b can have a substantially flat surface or can be formed as small plates.

The cell contacting system 1 further contains a support structure 13 as well as cell connectors 11a, 11b attached to the support structure 13, which serve to electrically contact and connect the individual energy storage cells 2a, 2b, 2z. Furthermore, open loop and/or closed loop control electronics 16 are positioned on the support structure 13 and are electrically connected to the cell connectors 11a, 11b via connection elements 15. The open loop and/or closed loop control electronics 16 include a circuit board 161a which is equipped with corresponding electronic components 162 and which is connected to the support structure 13.

Since the cell connectors 11a, 11b are connected to the cell contacting system 1, the complete cell contacting system 1 can be attached to the energy storage cells 2a, 2b, 2z of the energy storage device 3 via the cell connectors 11a, 11b. For this purpose, the cell connectors 11a, 11b can be welded to the pole contacts 22a, 22b, for example. The cell contacting system 1 can thus be kept in stock as an assembled module and can be mounted on the energy storage cells 2a, 2b, 2z as a unit in a single process step within an automated production line.

The cell contacting system 1 contains temperature control channels 131 and a degassing channel 132, each described in greater detail below, which are integrated into the support structure 13 in accordance with the invention. The temperature control channels 131 serve to conduct a gaseous or liquid fluid (not shown in the figures) through the energy storage device 3 in order to control the temperature of the latter. The degassing channel 132 serves to remove, in a controlled manner, gases released in the event of a so called "thermal runaway" of the energy storage device 3. A degassing opening 21 can be seen in FIG. 2. It opens out into the degassing channel 132. The degassing opening 21 can, for example, be formed as a predetermined breaking point, so that in the event of a thermal runaway the gases produced inside the energy storage cells 2a, 2b, 2z can escape at this point.

In the exemplary embodiment, fourteen energy storage cells 2a, 2b, 2z are shown, which are electrically connected to each other in a series circuit by the cell contacting system 1. For this purpose, the energy storage cells 2a, 2b, 2z are each arranged rotated relative to one another, so that the pole contact 22a of the anode of the energy storage cell 2a is opposite the pole contact 22b of the cathode of the adjacent energy storage cell 2b, or the pole contact 22b of the cathode of the energy storage cell 2b is opposite the pole contact 22a of the anode of the adjacent energy storage cell 2a. The pole contact 22b of the cathode of the first energy storage cell 2a is connected to the terminal cell connector 11b. The pole contact 22a of the anode of the first energy storage cell 2a is connected via the cell connector 11a to the pole contact 22b of the cathode of the adjacent, second energy storage cell 2b. The pole contact 22a of the anode of the second energy storage cell 2b is in turn connected to the pole contact 22b of the cathode of the third energy storage cell via a cell connector 11a, and so on. The pole contact 22a of the anode of the last energy storage cell 2z is connected to the cell connector 11b. The cell connectors 11b are intended to electrically connect the energy storage device 3 to an electrical consumer, not shown, for example the electric motor of an electric vehicle. The two cell connectors 11b thus form the energy storage device connections, i.e. the cathode and anode of the entire energy storage device 3.

In alternative embodiments of an energy storage device 3, a different number of energy storage cells can also be provided and/or the energy storage cells can be connected in parallel by the cell contacting system 1. For this purpose, the cell connectors 11a, 11b can, for example, connect the electrical connections 22a of the anodes of two or more energy storage cells or the electrical connections 22b of the cathodes of two or more energy storage cells. The energy storage cells can also be arranged in a row in the same orientation, i.e. not rotated, so that the electrical connections of the cathodes of the energy storage cells of the energy storage device 3 are arranged along a first line and the electrical connections of the anodes of the energy storage cells are arranged along a second line running parallel to the first line.

Figure 3:
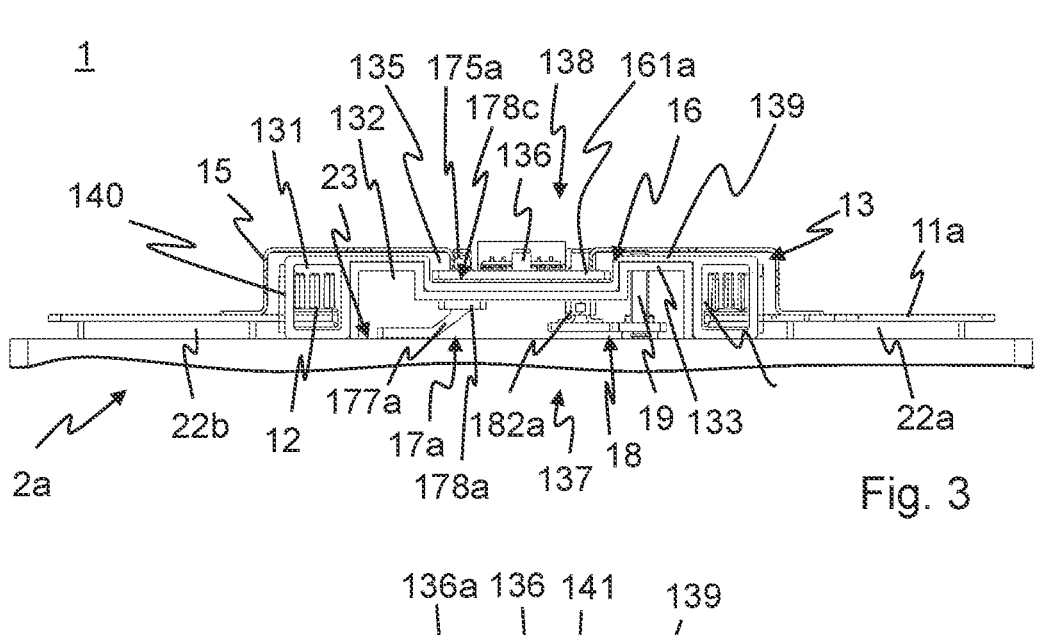
FIG. 3 is a front view of the exemplary embodiment of the cell contacting system from FIG. 1.

FIG. 3 shows a front view of the cell contacting system 1. The support structure 13 has a first side 137 facing the energy storage device 3 or the energy storage cells 2a, 2b, 2z, which serves as the mounting side for mounting on the energy storage device 3 or the energy storage cells 2a, 2b, 2z (not shown in FIG. 3), and a second side 138 facing away from the energy storage device 3 or the energy storage cells 2a, 2b, 2z. Furthermore, the support structure 1 has two lateral temperature control channels 131 located in the region of the cell connectors. The temperature control channels 131 and the degassing channel 132 are molded into the support structure 1 in accordance with the invention.

The degassing channel 132 is formed by the lateral temperature control channels 131, which are opposite each other, and by a wall 139, which runs between the temperature control channels 131. The degassing channel 132 is open on the first side 137 of the support structure 13 to the energy storage cells 2a, 2b, 2z. This allows gases to pass from the degassing openings 21 of the energy storage cells 2a, 2b, 2z into the degassing channel 132 in the assembled state of the cell contacting system 1 and to be discharged from there in a controlled manner. This increases the protection of vehicle occupants.

Figure 4A:
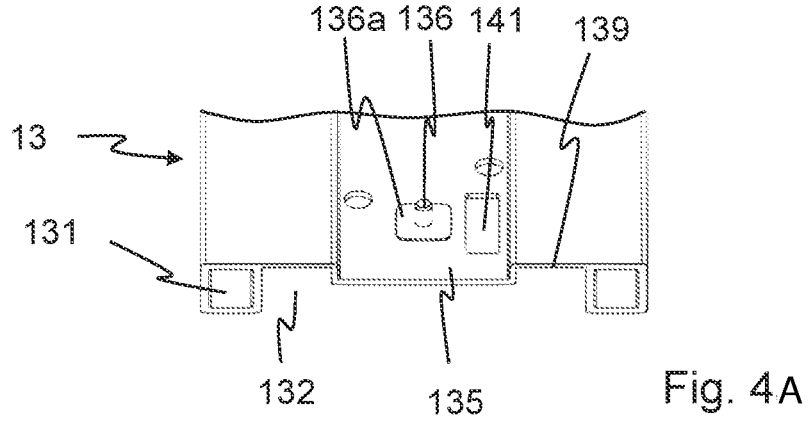
FIG. 4A is a perspective view of the support structure of the cell contacting system from FIG. 1.

As can be seen from FIG. 4A, the support structure 13 is embodied as a shaped part, in particular as an injection-molded part or extruded part, preferably in particular as an injection-molded plastics part or an extruded plastics part. The support structure 13 can be formed as a profile structure, preferably as a hollow profile structure. In this way, a cell contacting system 1 with a comparatively low weight can be created.

The support structure 13 is provided with a protective layer 133 (see FIG. 3) in the region of the first side 137, in particular for protecting against heat and/or abrasive media and/or chemical influences (for example by acids). The protective layer 133 may consist of a heat resistant and/or acid resistant material. The protective layer 133 may be either an applied coating (for example a liquid, curable coating, for example a lacquer with the addition of ceramic particles, a foamed and cured coating, or a powder coating) or a layer applied to the wall (for example mica sheets, ceramic fiber mats, glass fiber mats or carbon mats, or cork sheets) or a combination thereof. The protective layer may also be provided additionally under the temperature control channels 131a, 131b if required (not shown in the figures).

The temperature control channels 131 are each formed by a hollow chamber. As can be seen in FIG. 3, the temperature control channels 131 have lateral through openings 140, into which cell connectors 11a, 11b over-molded with a cooling structure 12 are inserted and fastened. The cooling structure 12 can, for example, be adhesively bonded and/or welded to the support structure 1. In this way, the through opening 140 is tightly sealed. The cooling structure 12 of the cell connectors 11a, 11b is surrounded by the fluid for temperature control in the temperature control channels 131 and are in thermal contact with the fluid.

Furthermore, the support structure 13 has a mounting recess 135 on the second side 138 opposite the degassing channel 132. This is formed by an offset of the wall 139. The mounting recess 135 serves to position the open loop and/or closed loop control electronics 16 in a particularly space saving manner. Fastening and/or centring means 136 can be provided at the mounting base of the mounting recess 139 for fastening and/or centring the circuit board of the open loop and/or closed loop control electronics 16. Spacers 136a may also be provided, which cause the underside of the open loop and/or closed loop control electronics 16 or circuit board 161a thereof to be spaced apart from the mounting base of the mounting recess 139. The mounting recess 135 allows a flat structure of the cell contacting system 1. The offset of the wall 139 forming the mounting recess 135 also serves to increase the mechanical stability of the support structure 13. The offset acts here as a bead, i.e. a channel shaped stiffening means, which increases the second moment of area of the support structure 13. The support structure 13 can thus better withstand, for example, an increase in pressure in the degassing channel 132 occurring during degassing of the energy storage cells 2a, 2b, 2z. Furthermore, the wall 139 has through openings 141 for temperature sensor arrangements 17a, 17b and/or for contacting a sensor circuit board 18a, 18b.

The circuit board 161a has, for example, holes via which the circuit board 161a is fitted on the fastening and/or centring means 136, which in the exemplary embodiment are in the form of "domes". The ends of the domes can then be upset to form mushroom heads, thereby fastening the circuit board 161a to the support structure 13.

Figure 4B:
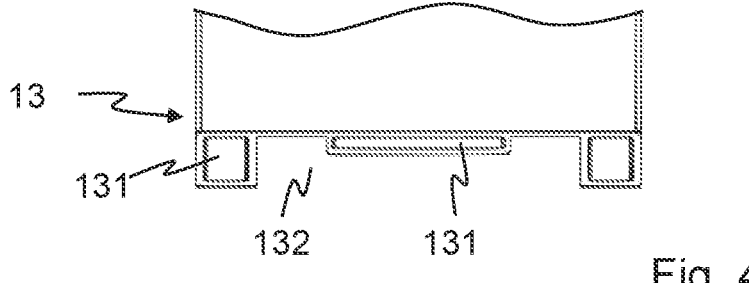
FIG. 4B is a perspective view of a further embodiment of the support structure.

If required, more than two temperature control channels 131 may also be formed in the support structure 13. For example, as shown in FIG. 4B, an additional temperature control channel 131 can be located in the middle on the underside of the wall 139, whereby the wall 139 between the two outer temperature control channels 131 and thus a circuit board located on the upper side can be additionally temperature controlled.

Figure 4C:
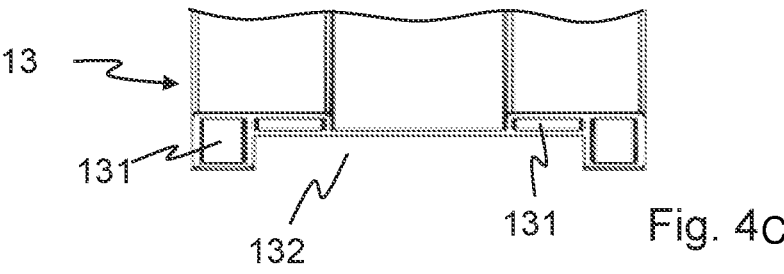
FIG. 4C is a perspective view of a further embodiment of a support structure.

According to the embodiment shown in FIG. 4C, a second temperature control channel 131 is provided in each side region.

Figure 5:
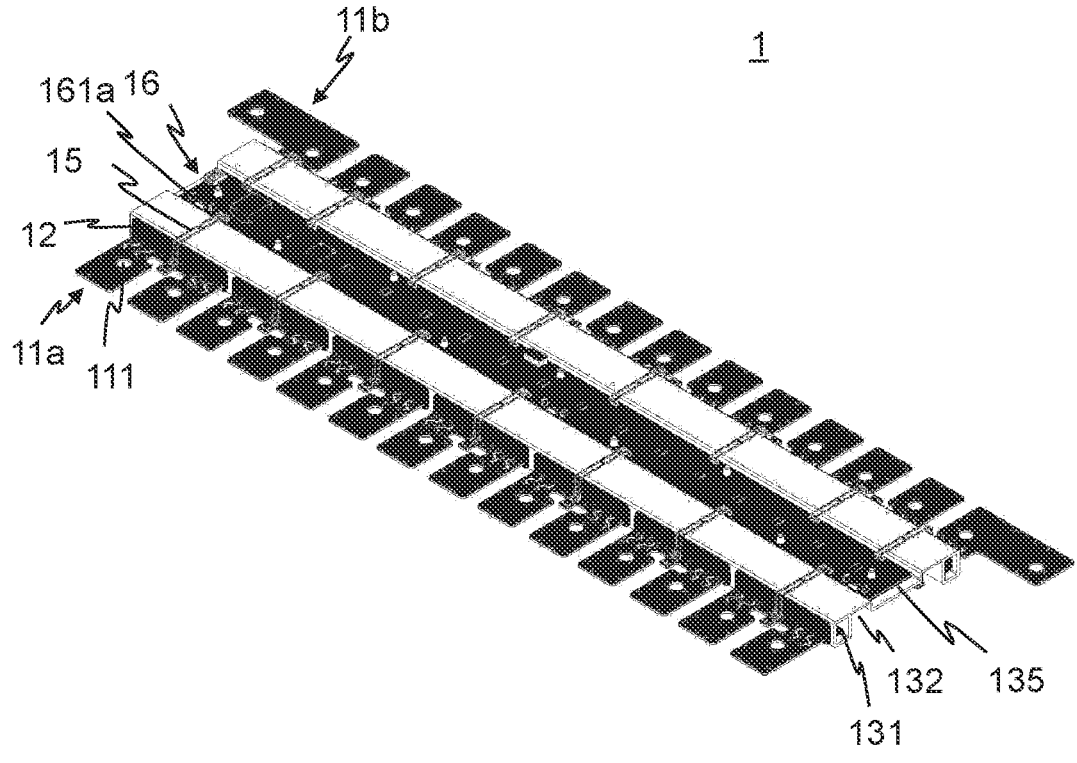
FIG. 5 is a perspective view of the cell contacting system from FIG. 1 as a mountable module.

FIG. 5 shows the cell contacting system 1 according to the invention as a pre assembled module containing the cell connectors 11a, 11b, the temperature control channels 131, the degassing channel 132 and the open loop and/or closed loop control electronics 16. The cell contacting system 1 simplifies the manufacture of energy storage devices 3 considerably in that only the cell connectors can be mounted on the energy storage cells, for example by welding. Alternatively, the cell connectors can also be screwed or soldered to the energy storage cells.

Through openings 111, for example through holes, can be provided on the cell connectors 11a, 11b. These can serve as inspection openings. Furthermore, if required, measuring lines can also be attached, through these through openings 111, to threaded holes located beneath the through openings 111 on the pole contacts 22a, 22b. In this way, for example, the contacting of the cell connectors 11a, 11b to the pole contacts 22a, 22b can be checked.

Alternatively, the cell connectors 11a, 11b could also be connected, for example screwed, to the pole contacts 22a, 22b via the through openings 111 if required.

Figure 6A:
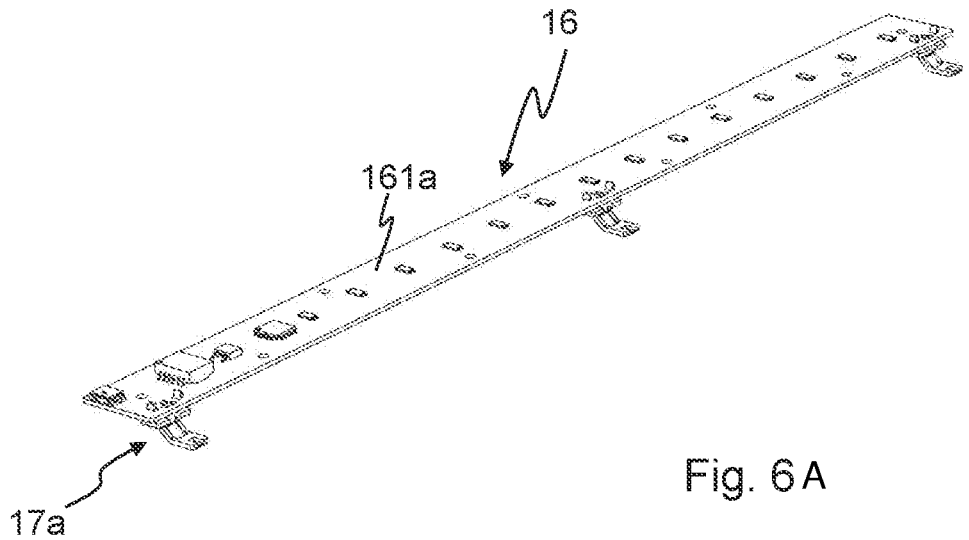
FIG. 6A is a perspective view of the circuit board of the cell contacting system from FIG. 1 containing an open-loop and closed-loop control electronics of the energy storage cells or the energy storage device, with temperature sensor arrangements fixed to the circuit board.
Figure 6B:
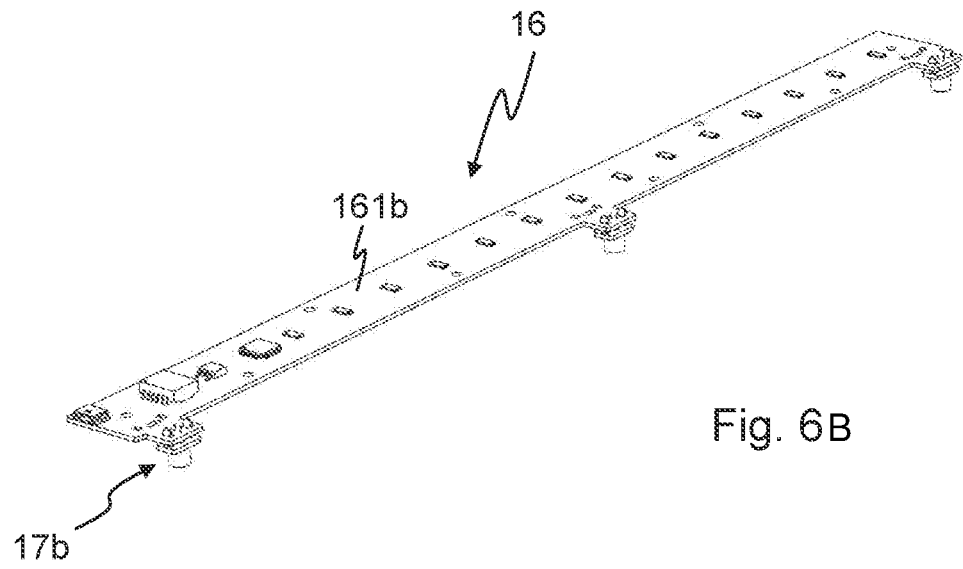
FIG. 6B is a perspective view of a further embodiment of a circuit board of the cell contacting system with temperature sensor arrangements fixed to the circuit board.

FIGS. 6A and 6B show two exemplary embodiments of temperature sensor arrangements 17a, 17b for detecting the temperature on an upper side 23, not shown, of an energy storage cell 2a, 2b, 2z. In the exemplary embodiments, the temperature sensor arrangement 17a is mounted on the circuit board 161a and the temperature sensor arrangement 17b is mounted on the circuit board 161b via a snap connection in each case. The circuit board 161b can also be provided for temperature sensor arrangements 17a.

Figure 7A:
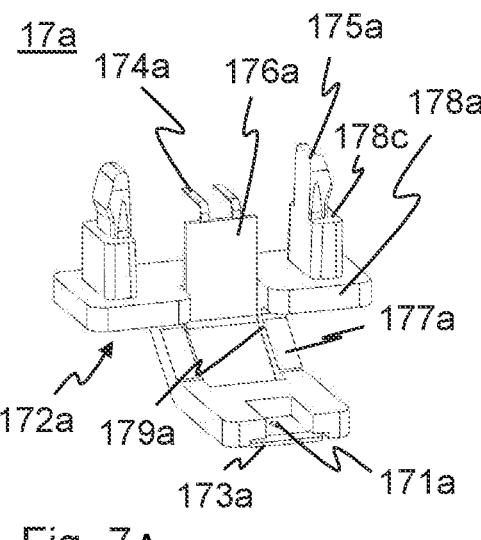
FIG. 7A is a perspective view of a temperature sensor arrangement of the cell contacting system from FIG. 1.
Figure 7B:
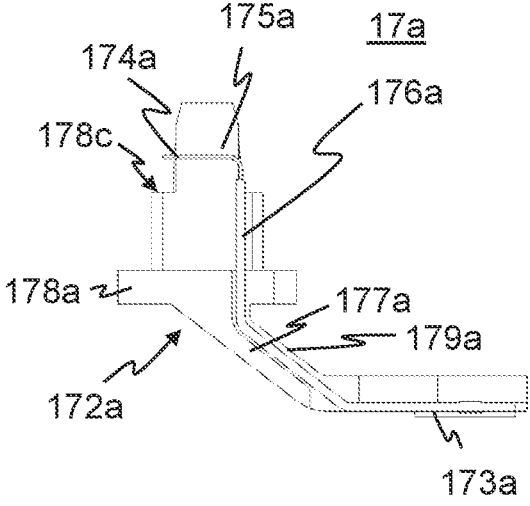
FIG. 7B is a sectional view of the temperature sensor arrangement from FIG. 7A.

FIGS. 7A and 7B show a perspective illustration and a sectional illustration of a first exemplary embodiment of the temperature sensor arrangement 17a.

The temperature sensor arrangement 17a comprises a flexible sensor circuit board 176a having a sensor element 171a integrated on the sensor circuit board 176a and a shaped housing element 172a for mounting on the circuit board 161a, 161b from FIGS. 6A, 6B.

The shaped housing element 172a comprises a guide channel 179a for the flexible sensor circuit board 176a and thus serves to position and hold the sensor element 171a. Furthermore, the shaped housing element 172a has a base 178a with connection means 175a and an elastically deflectable spring arm 177a. The connection means 175a are configured as a snap connection with two resilient detent arms. They are used to connect to the circuit board 161a from FIG. 6A. Steps 178c are also provided on the connection means 175a and serve as a contact point on the underside of the circuit board 161a.

The sensor circuit board 176a has electrical connections 174a which are electrically connected to the sensor element 171a via conductor tracks that are not shown.

In addition, an elastic, thermally conductive contact element 173a is provided on the underside of the temperature sensor arrangement 17a in the region of the sensor element 171a in order to avoid gap formation and to transfer the temperature of the energy storage cells to be detected to the sensor element 171a.

Figure 9:
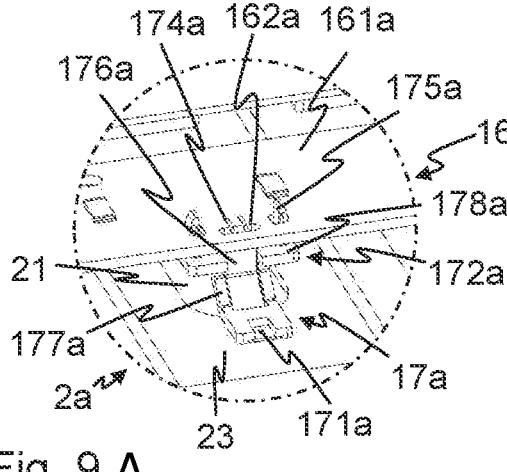
FIG. 9A is a detailed perspective view of the temperature sensor arrangement from FIG. 7A or 7B in the mounted state.
FIG. 9B is a detailed perspective view of the temperature sensor arrangement from FIG. 7B in the mounted state.
Figure 9:
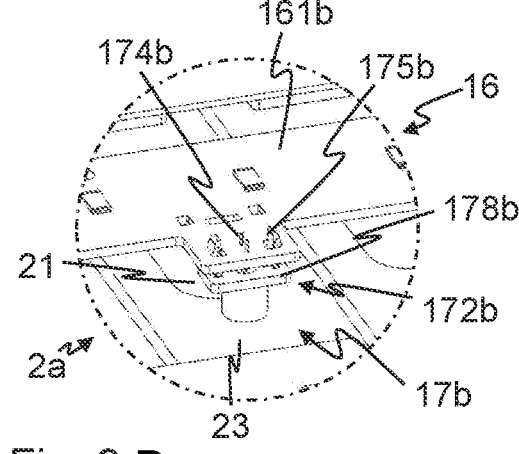

FIG. 9A shows the temperature sensor arrangement 17a of FIGS. 7A and 7B in the assembled state without the support structure 13. The detent arms engage through recesses provided on the circuit board 161a and thus establish a mechanical connection to the circuit board 161a. The spring arm presses the sensor element 171a onto the upper side 23 of the energy storage cell 2a. The electrical connections 174a extend through the circuit board 161a through a slot shaped recess 162a and are connected to the circuit board 161a, for example soldered via solder pads.

When mounting the temperature sensor arrangement 17a, the shaped housing element 172a can first be connected to the sensor circuit board 161a. The sensor circuit board 176a can then be inserted from the side opposite the shaped housing element 172a through the slot shaped recess 162a of the circuit board 161a into the guide channel 179a of the shaped housing element 172a. After the sensor circuit board 176a is positioned in the guide channel 179a, the electrical connections 174a of the sensor circuit board 176a can be connected to the circuit board 161a. This facilitates handling. In addition, the assembly can be automated as a result.

As can be seen from FIG. 3, the temperature sensor arrangement 17a extends through the through opening 141 (cf. FIG. 4A) of the support structure 13 and can thus be positioned in the degassing channel 132. The support structure 13 causes a thermal separation of the circuit board 161a from the sensor element 171a. As a result, the circuit board 161a remains intact even in the event of thermal destruction of the temperature sensor arrangement 17a, and the defect in the temperature sensor arrangement 17a, 17b can still be detected by the open loop and/or closed loop control electronics 16. The steps 178c lie against the underside of the circuit board 161a.

The base 178a is provided to cover or close the through opening 141 of the support structure on the first side 137 thereof. A flow of gases through the through opening 141 is thus prevented or at least reduced.

Figure 8A:
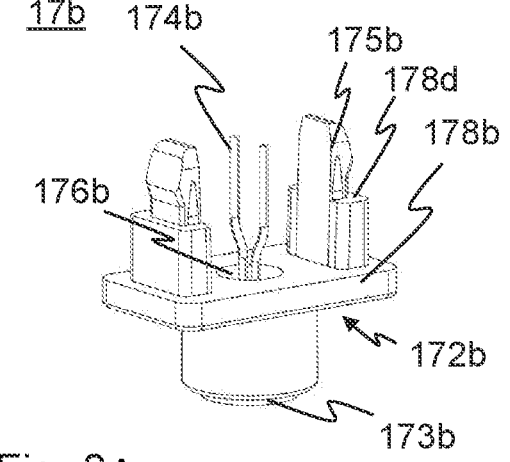
FIG. 8A is a perspective view of a further embodiment of a temperature sensor arrangement for a cell contacting system.
Figure 8B:
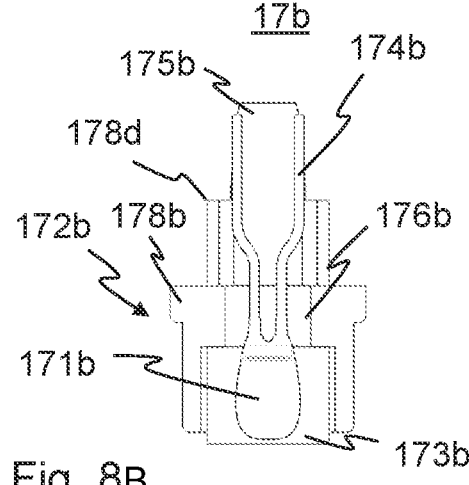
FIG. 8B is a sectional view of the temperature sensor arrangement from FIG. 8A.

FIGS. 8A and 8B show a perspective view and a sectional view of a further embodiment of a temperature sensor arrangement 17b. The temperature sensor arrangement 17b has a sensor element 171b and a shaped housing element 172b. The shaped housing element 172b has a base 178b with connection means 175b and a step 178d, which have a corresponding structure and the same function as the base 178a, the connection means 175a and the step 178c of the temperature sensor arrangement 17a according to FIGS. 7A and 7B.

In this embodiment, the shaped housing element 172b of the temperature sensor arrangement 17b has a chamber 176b for positioning the sensor element 171b. The chamber 176b is open on the side facing the circuit board 161a, 161b, 161c. This allows the sensor element 171b to be pushed into the chamber 176b.

The sensor element 171b may be a wired electronic component for through hole technology (THT) with two electrical connections 174b.

A contact element 173b, which at least partially encloses the sensor element 171a, is located on the side of the shaped housing element 172b facing away from the electrical connections 174b. The contact element 173b consists of an elastic, thermally conductive material. Further, the contact element 173b is partially enclosed by the chamber 176b and abuts a shoulder in the chamber 176b.

FIG. 9B shows the temperature sensor arrangement 17b from FIGS. 8A and 8B in the assembled state without the support structure 13.

The temperature sensor arrangement 17b is mechanically connected to the circuit board 161b by snap connection via the connection means 175b.

To connect the electrical connections 174b, the circuit board 161b can have contact holes with contact rivets, for example. The electrical connections 174b can be inserted through these holes and soldered to the circuit board 162b from the side opposite the sensor element 171b.

The contact element 173b, which is concealed by the shaped housing element 172b in FIG. 9B, is compacted or compressed. This allows the sensor element 171b to be installed pressing with a certain contact pressure onto the upper side 23 of the energy storage cell 2a.

The temperature sensor arrangement 17b may be mounted on the circuit board 161b as an assembled module.

By pressing the temperature sensor arrangements 17a, 17b, a good thermal contact is ensured. In addition, it is possible to compensate for manufacturing tolerances, thermal expansions or relative movements of the components.

One of the two temperature sensor arrangements 17a, 17b or a combination of both of them may be provided in the cell contacting system 1.

A circuit board can be a printed circuit board, i.e. a printed circuit for carrying electronic components.

Figure 2:
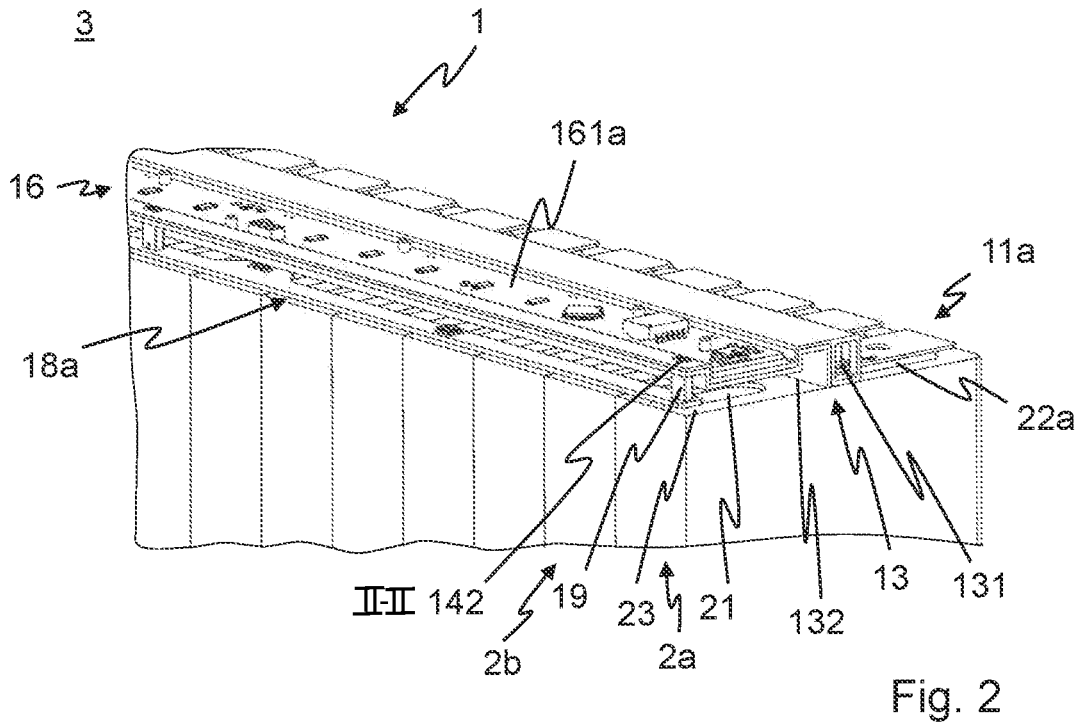
FIG. 2 is a perspective longitudinal sectional view of the exemplary embodiment of the energy storage device from FIG. 1 taken along the section line II-II.
Figure 10A:
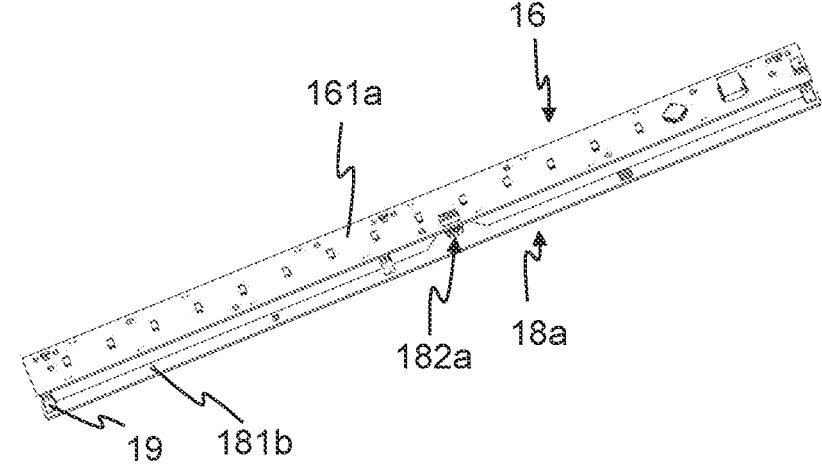
FIG. 10A is a perspective view of the circuit board arrangement consisting of circuit board and additional circuit board of the cell contacting system from FIG. 1.
Figure 10B:
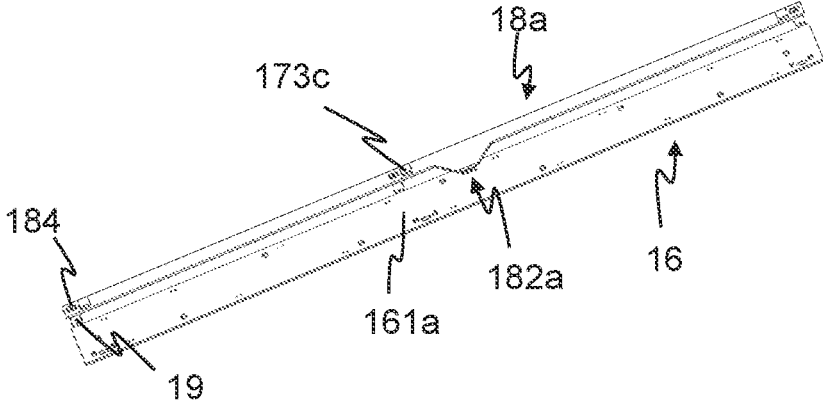
FIG. 10B is a perspective view of the circuit board arrangement consisting of circuit board and additional circuit board of the cell contacting system from FIG. 1.

FIGS. 10A and 10B show a circuit board arrangement of the cell contacting system 1 in the form of the circuit board 161a with an additional circuit board 18a on which sensor elements 181b and, in FIG. 10B, sensor elements 181a concealed by contact elements 173c, such as temperature sensor elements, gas sensor elements, moisture sensor elements or pressure sensor elements, are located. FIGS. 2 and 3 show the positioning of the circuit board arrangement according to FIGS. 10A and 10B on the energy storage cells 2a, 2b, 2z of the energy storage device 3.

Figure 11A:
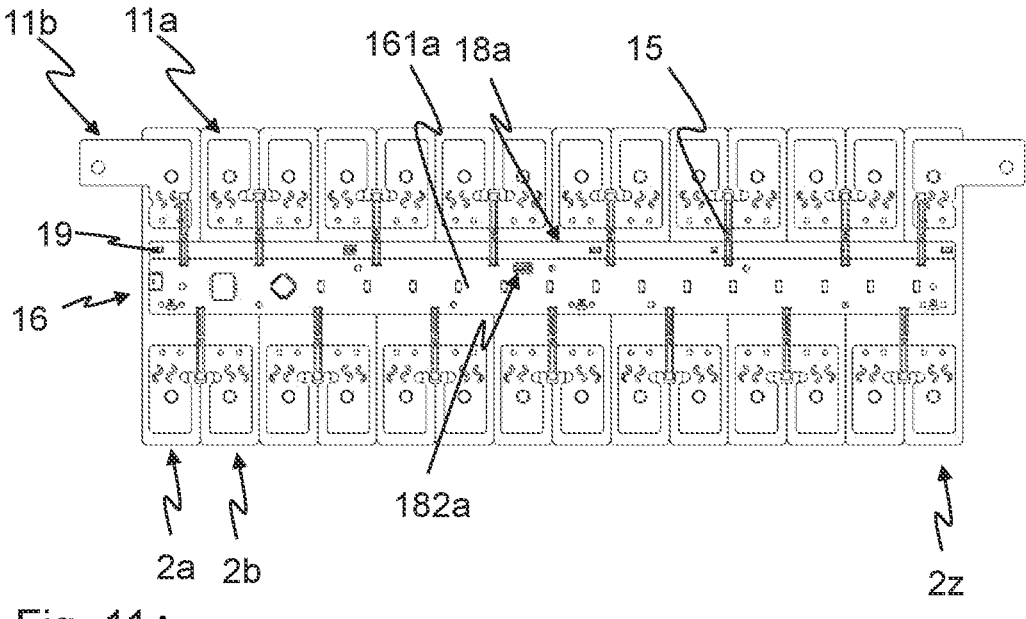
FIG. 11A is a plan view of the cell contacting system from FIG. 1 with the support structure omitted.
Figure 11B:
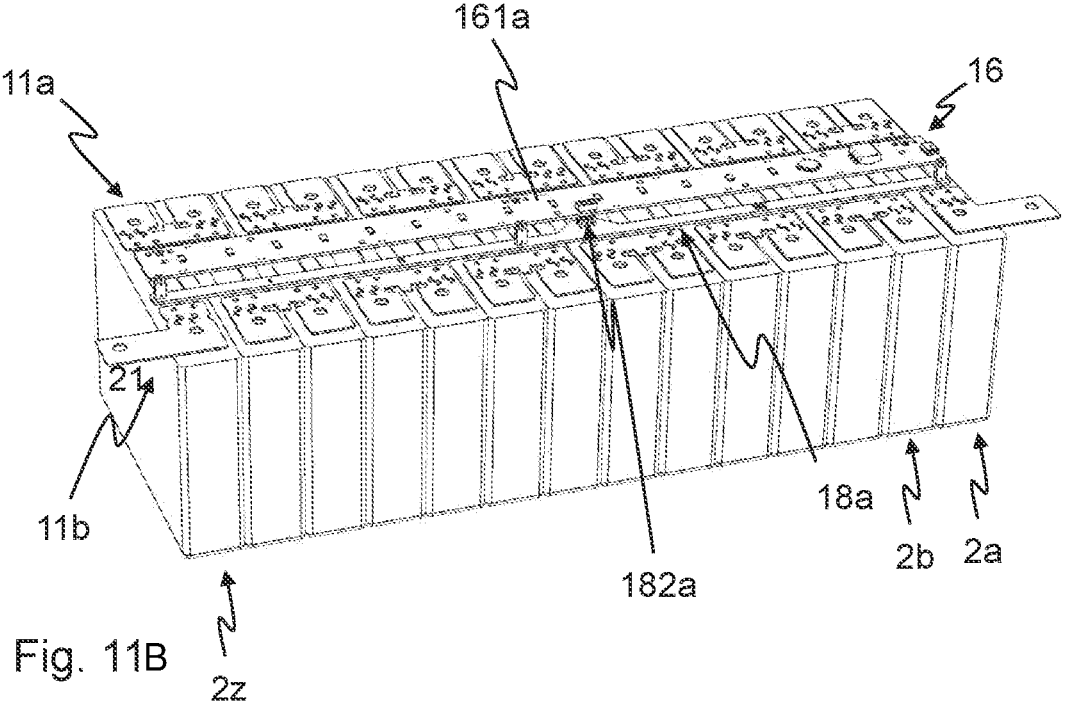
FIG. 11B is a perspective view of the cell contacting system from FIG. 1 with the support structure omitted.

FIGS. 11A and 11B show the positioning of the circuit board arrangement according to FIGS. 10A and 10B on the energy storage cells 2a, 2b, 2z of an energy storage device 3, with omission of the support structure 13 for illustrative purposes. The circuit board arrangement can be used to position sensors for different parameters, for example for temperature, for gas, for pressure and/or for moisture, along the surface of the energy storage device 3.

Figure 12:
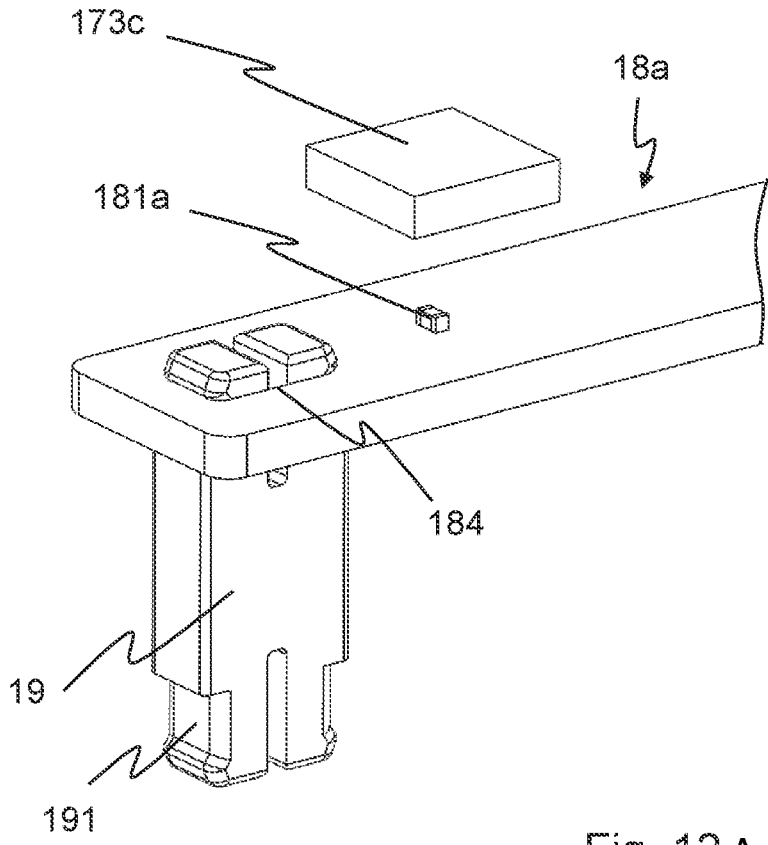
FIG. 12A is a partial perspective view of the circuit board arrangement from FIG. 1 in the region of the spacers.
FIG. 12B is a partial perspective illustration of the circuit board arrangement from FIG. 1 in the region of the connection between the circuit board and the additional circuit board.
FIG. 12C is a partial perspective view of an alternative embodiment of the circuit board arrangement in the region of the connection between the circuit board and the additional circuit board.
Figure 12:
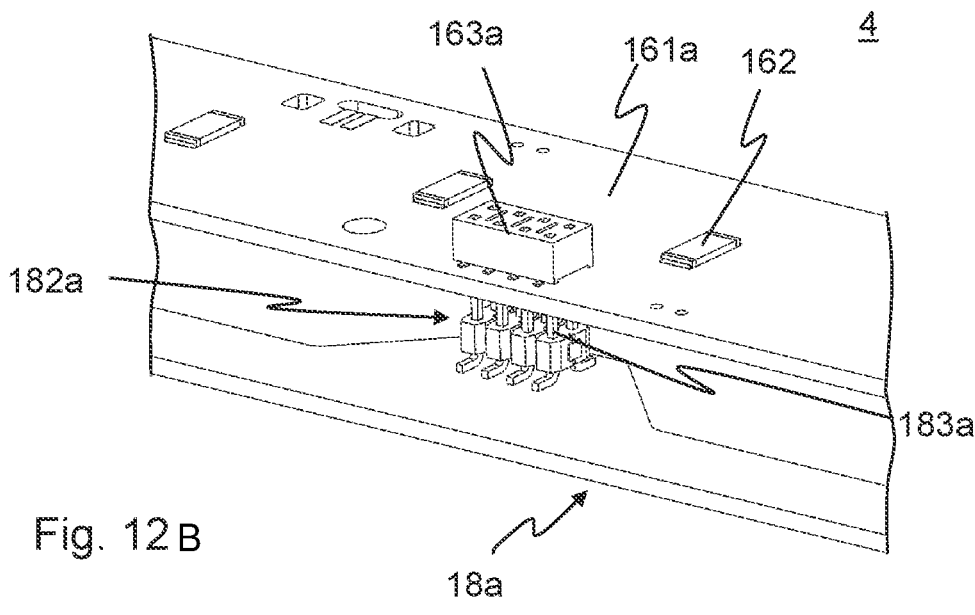
Figure 12:
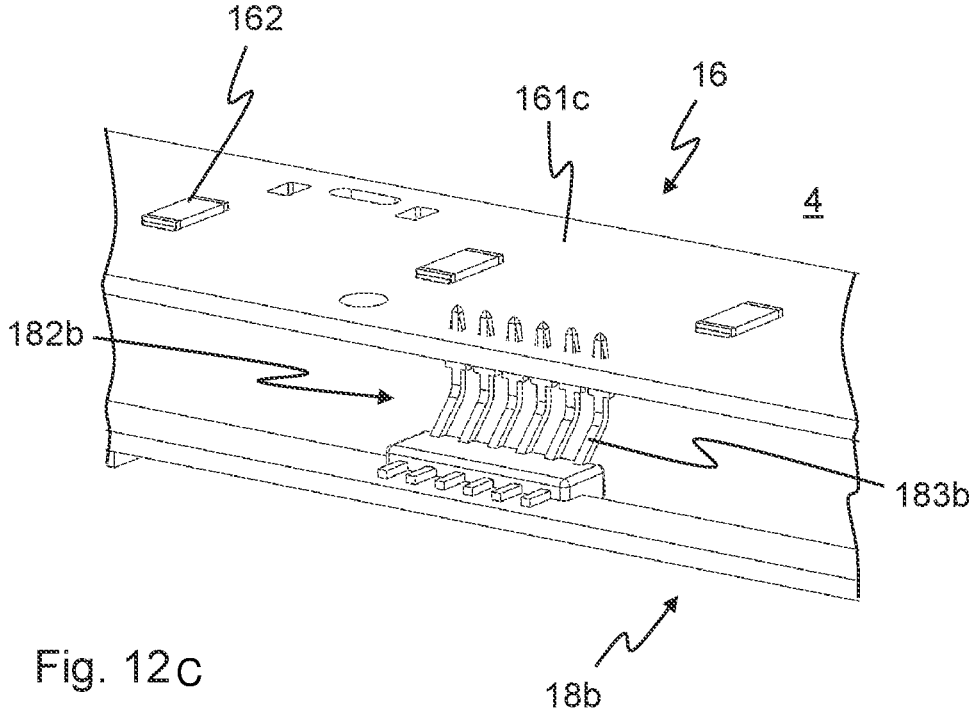

FIG. 12A shows an enlarged detail of an additional circuit board 18a according to FIGS. 10A and 10B in the region of the spacer 19.

FIG. 12B shows an enlarged illustration of the contacting means 182a between circuit board 161a and additional circuit board 18a.

FIG. 12C shows an alternative embodiment of a circuit board 161c and an additional circuit board 18b with alternative contacting means 182b.

According to FIGS. 10A and 10B, the additional circuit board 18a and the circuit board 161a are spaced apart, vertically offset from each other and electrically connected to each other via contacting means 182a. In the assembled state of the cell contacting system 1, the contacting means 182a extend through a through opening 141 of the support structure 13 (see FIG. 3). In an advantageous manner, this allows the additional circuit board 18a to be positioned on the side 137 of the support structure 13 facing the energy storage device within the degassing channel 132. This results in a thermal separation of the additional circuit board 18a from the circuit board 161a through the wall 139 and/or the protective layer 133 of the support structure 13.

The additional circuit board 18a in FIGS. 10A, 10B is plate shaped and mechanically connected to the support structure 13 via spacers 19. As shown in FIG. 12A, the spacers 19 each have connection means 191 on the side facing the additional circuit board 18a and on the side facing the support structure 13. The connection elements 191 may be in the form of a snap connection with two detent arms. The detent arms are resilient elements that can each engage through the additional circuit board 18a and the support structure 13 to establish a mechanical connection to the additional circuit board 18a and the support structure 13. For this purpose, the additional circuit board 18a can have recesses 184 and the support structure 13 can have recesses 142 (see FIG. 2) in which the connection elements 191 can engage.

Sensor elements 181a, 181b are provided on the additional circuit board 18a and are electrically connected to the circuit board 161a via conductor tracks, not shown, and via the contacting means 182a, 181 b. The sensor elements 181a, 181b can be SMD components, for example, which are soldered to the additional circuit board 18a at solder pads.

According to FIG. 10A, the sensor element 181b is located on the side of the additional circuit board 18a facing the circuit board 161a. The sensor element 181b can be, for example, a sensor element measuring an ambient parameter, for example a temperature sensor element, a gas sensor element, a moisture sensor element or a pressure sensor element. The sensor element 181b is not in direct contact with an energy storage cell when the cell contacting system 1 is assembled. As a result, the sensor element 181b can be used to measure, for example, a gas temperature, a gas composition, a moisture or a pressure in the degassing channel 132. The sensor element 181b can also be an electronic component that can detect a plurality of ambient parameters.

As shown in FIG. 12A, the sensor element 181a is located on the side of the additional circuit board 18a facing away from the circuit board or facing the energy storage cells. The sensor element 181a can, for example, be a temperature sensor element, for example a Pt 100 resistor configured as an SMD component. A contact element 173c is located on the sensor element 181a and is in contact with the sensor element 181a (shown enlarged and spaced apart in FIG. 12A). The contact element 173c consists of a thermally conductive, elastic material. When mounting the cell contacting system 1 on the energy storage cells of the energy storage device 3, the contact element 173c can be compacted or compressed. As a result, the sensor element 181a can be pressed onto the upper side 23 of the energy storage cell with a certain contact force. For this purpose, the sensor elements

181a can advantageously be located in the region of the spacers 19. By pressing the sensor element 181a, thermal contact is ensured. In addition, it is possible to compensate for manufacturing tolerances, thermal expansions or relative movements of the components.

According to FIGS. 12B and 12C, the contacting means 182a, 182b are protruding conductor bars 183a, 183b, which can be soldered, for example, to solder pads on the additional circuit board 18a, 18b.

According to FIG. 12B, the circuit board 161a has through openings for the contacting means 182a and a contacting strip 163a. The contacting strip 163a can be soldered to the circuit board 161a. The conductor bars 183a can be plugged into the contacting strip 163a. The contacting strip 163a can have spring contacts for this purpose, for example.

According to FIG. 12C, the circuit board 161c has press fit through openings for the contacting means 182b. The conductor bars 183b can be pressed into the press fit through openings.

The additional circuit board 18b has a different configuration in the region of the contacting means 182b as compared to the additional circuit board 18a.

Figure 13A:
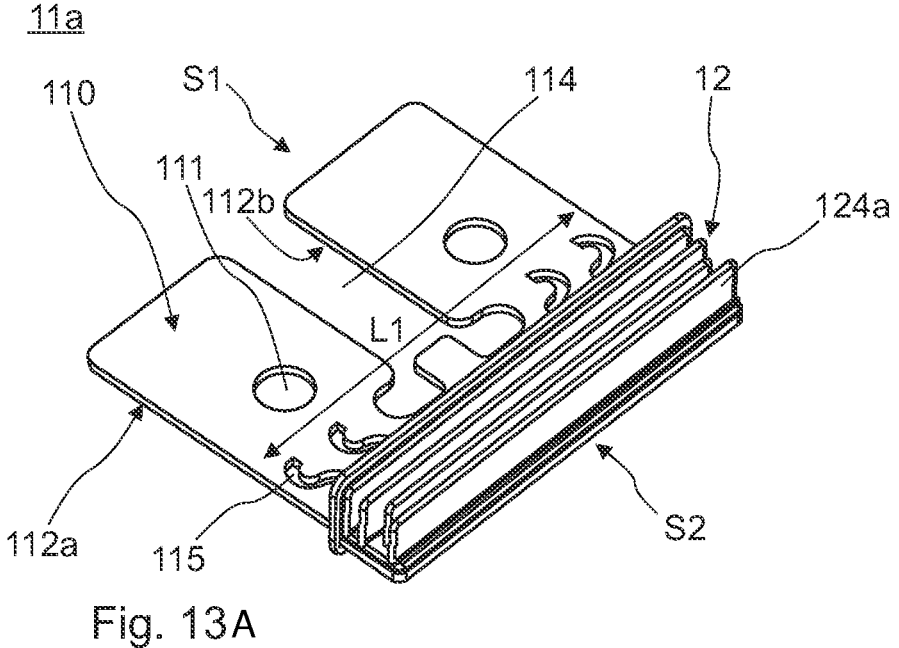
FIG. 13A is a detailed perspective view of a cell connector from FIG. 1.
Figure 13B:
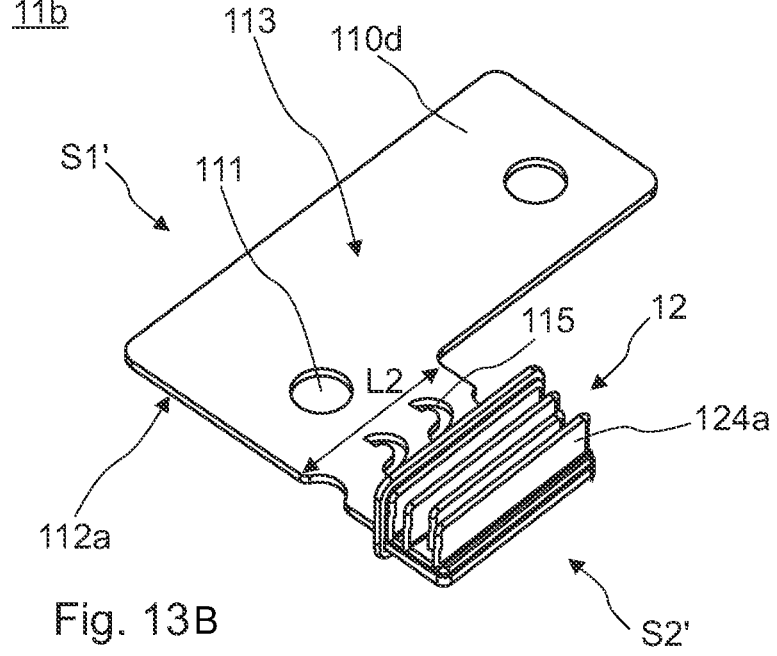
FIG. 13B is a detailed perspective view of a cell connector on the connection side from FIG. 1.
Figure 14A:
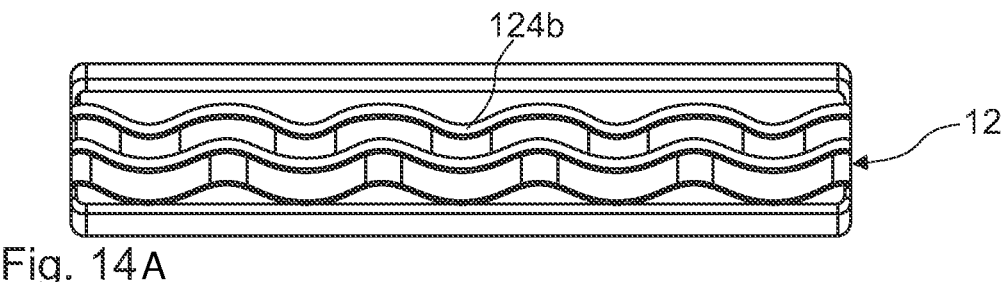
FIG. 14A is a perspective view of a further embodiment of a temperature control structure of a cell connector.
Figure 14B:
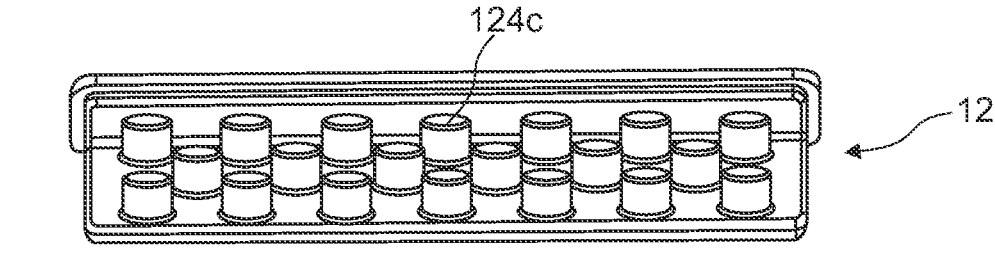
FIG. 14B is a perspective view of a further embodiment of a temperature control structure of a cell connector.
Figure 14C:
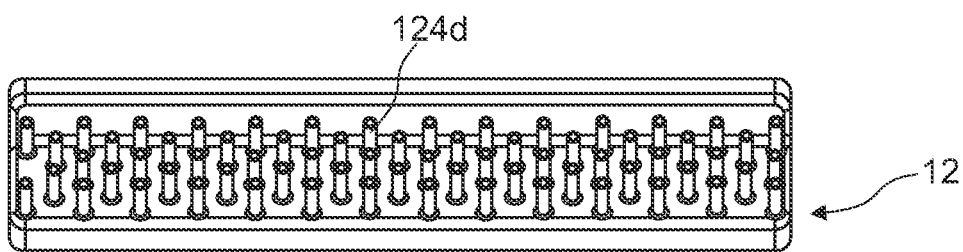
FIG. 14C is a perspective view of a further embodiment of a temperature control structure of a cell connector.
Figure 14D:
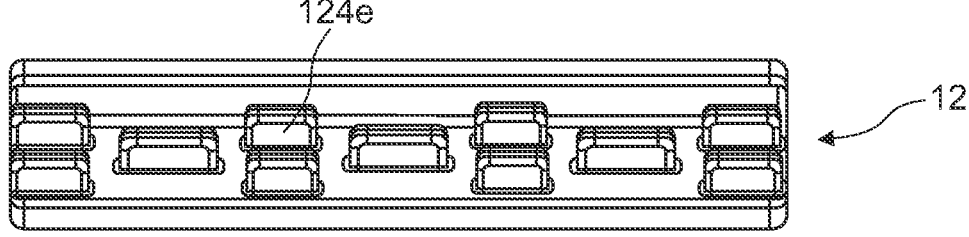
FIG. 14D is a perspective view of a further embodiment of a temperature control structure of a cell connector.

FIGS. 13A and 13B show cell connectors 11a, 11b for electrically contacting the pole contacts 22a, 22b of the energy storage cells 2a, 2a, 2z. In the exemplary embodiment, two terminal cell connectors 11b and thirteen cell connectors 11a are shown.

The cell connectors 11a are intended to electrically connect a pole contact 22a of one energy storage cell, for example 2a, to a pole contact 22b of an adjacent energy storage cell, for example 2b. For this purpose, the cell connectors 11a have a main body 110 with a first contact face 112a and a second contact face 112b, which are each connected, for example welded, to a pole contact 22a, 22b.

The two cell connectors 11b are intended to provide, at the first energy storage cell 2a and the last energy storage cell 2z, a contacting means to an electrical consumer, not shown, for example an electric motor of an electric vehicle, or to an adjacent energy storage device. The cell connectors 11b have a main body 113 with a contact face 112a which is connected, for example welded, to the pole contact 22b of the cathode of the first energy storage cell 2a or the pole contact 22a of the anode of the last energy storage cell 2z. Furthermore, the main body 113 has a current tap 110d. The current taps 110d of the two cell connectors 11b thus form the connections of the anode and cathode of the energy storage device 3.

The main body 110, 113 of the cell connector 11a, 11b consists of an electrically conductive flat material with preferably a constant layer thickness, for example a sheet metal. The main body 110, 113 has a first side S1, S1' and a second side S2, S2' and is over-molded in each case in the region of the second side S2, S2' in a partial region 110a with a temperature control structure 12 which increases the surface area of the cell connector 11a, 11b. The temperature control structure 12 has, for example, a plurality of temperature control ribs 124a running parallel to one another.

The temperature control structure 12 is preferably a thermally conductive, electrically insulating material, in particular plastic.

In the cell connector 11a, the temperature control structure 12 extends along the entire length L1 of the first side S1. In the cell connector 11b, the temperature control structure 12 extends only along the length L2 of the first side S1' in the region of the contact face 112a.

A recess 114 may be provided between the contact faces 112a, 112b of the cell connector 11a. On the one hand, this recess shifts the flow of current and the resultant heat into the partial region 110a over-molded by the temperature control structure 12. On the other hand, the main body 110 thus has a higher elasticity. It is thus possible to better compensate for thermal expansions or movements of the adjacent energy storage cells 2a, 2b, 2z relative to each other.

Furthermore, the main bodies 110, 113 of the cell connectors 11a, 11b can have recesses 115, for example in the form of crescent shaped through openings. These also increase the elasticity of the main bodies 110, 113.

FIGS. 14A to 14D show various embodiments of the temperature control structure 12. Temperature control wave structures 124b, temperature control nubs 124c, temperature control pins 124d, or temperature control bars 124e may be provided as the temperature control structure.

FIGS. 15A, 15B, 16A, 16B, 17A and 17B show alternative embodiments of cell connectors 11a, in which an additional contact element 121a, 121b, 121c is provided which is in direct contact with the upper side 23 of the energy storage cell via a contact face 122a, 122b, 122c. This allows for temperature control of the energy storage cells 2a, 2b, 2z.

Figure 15A:
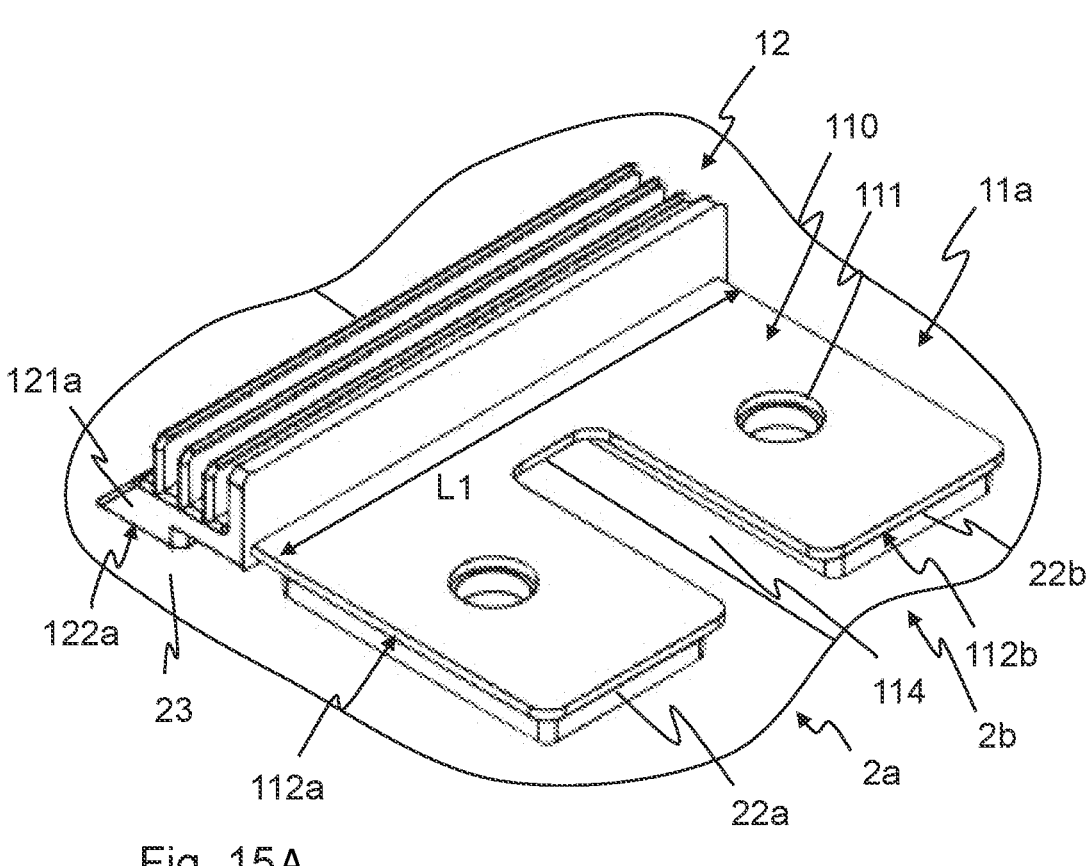
FIG. 15A is a perspective view of a further embodiment of a cell connector.
Figure 15B:
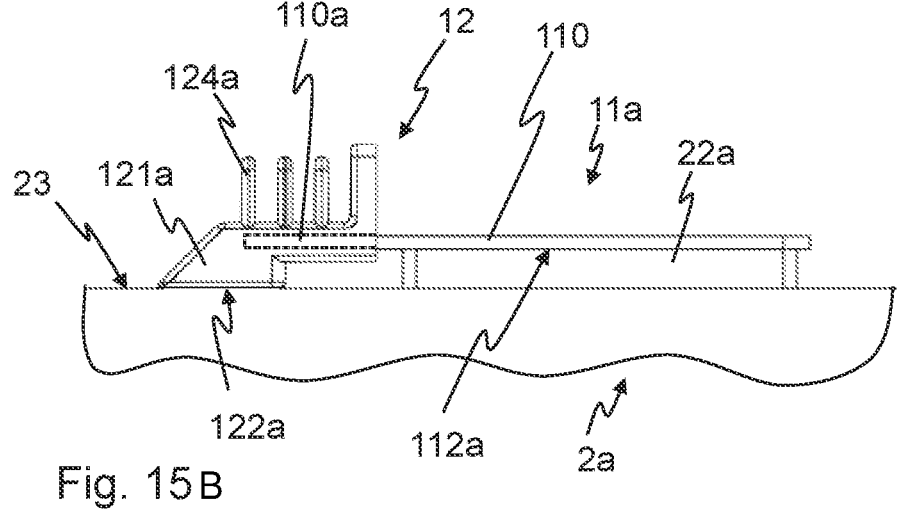
FIG. 15B is a side view of the cell connector according to FIG. 15A.

The contact element 121a of the temperature control structure 12 from FIGS. 15A and 15B is injection molded here around the end region of the main body 110 in such a way that its contact face 122a rests on the surface of the energy storage cells 2a, 2b or bridges the height of the pole contacts 22a, 22b, cf. FIGS. 15A, 15B.

FIGS. 16A and 16B and FIGS. 17A and 17B show two further alternative embodiments of cell connectors 11a with a contact element 121b, 121c, for example a contact plate.

Figure 16A:
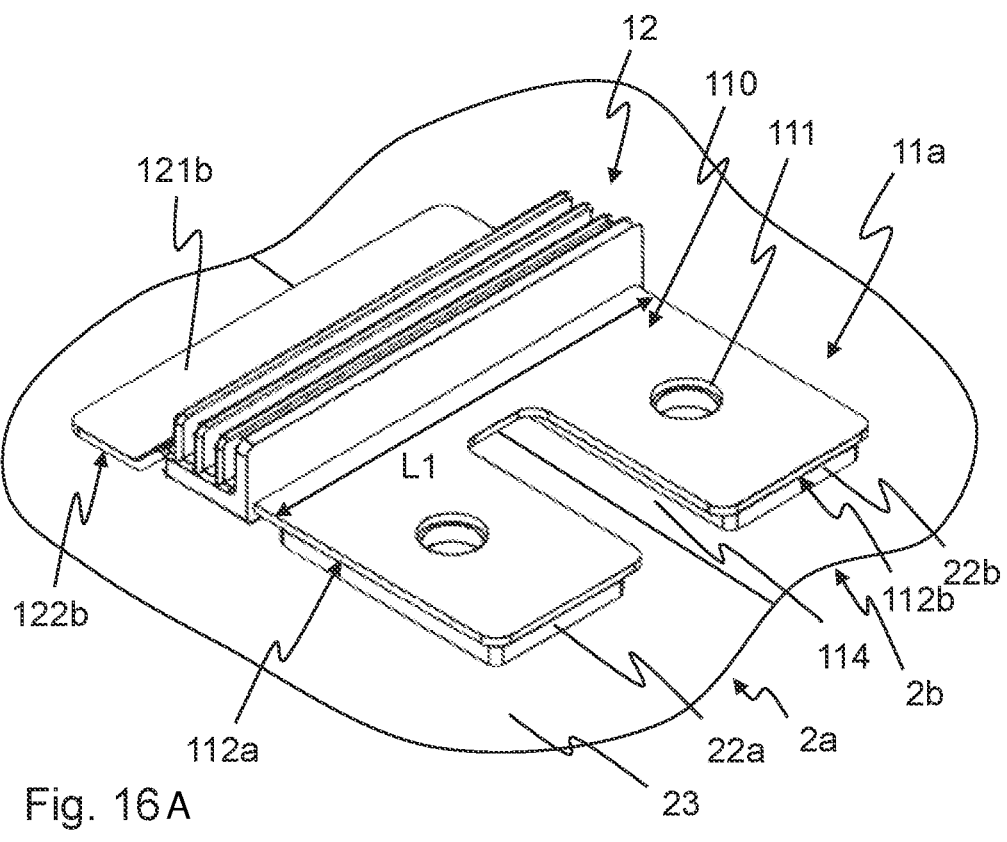
FIG. 16A is a perspective view of a further embodiment of a cell connector.
Figure 16B:
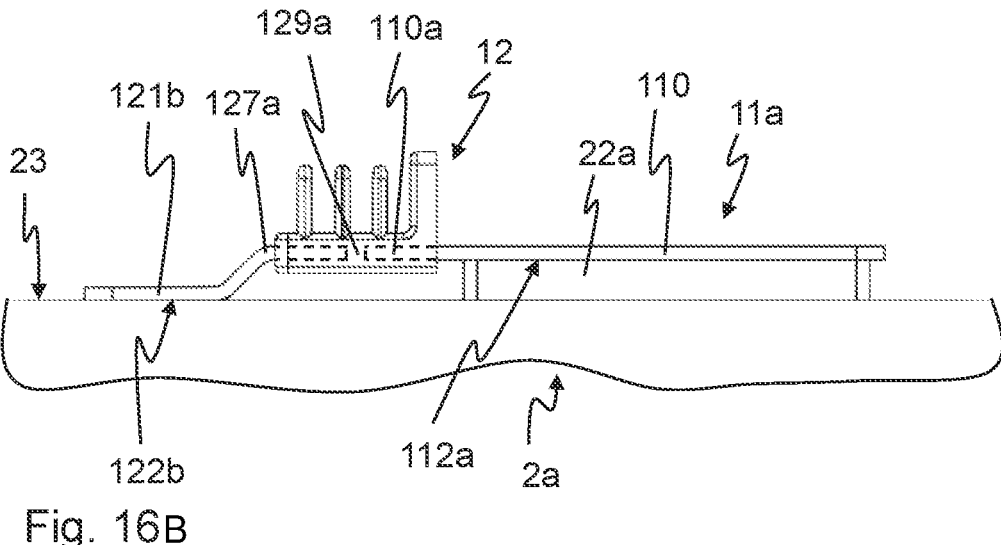
FIG. 16B is a side sectional view of the cell connector according to FIG. 16A.

According to FIGS. 16A and 16B, the contact element 121b is over-molded by the temperature control structure 12 and has an offset 127a. The offset 127a may have substantially the same height as the pole contacts 22a, 22b with respect to the surface 23. This allows the main body 110 and the contact element 121b to be connected to each other, for example, in one plane, with the result that the contact element 121b rests directly on the upper side of the energy storage cells. A gap 129a is provided between the main body 110 and the contact element 121b so that the main body 110 and the contact element 121b are not in direct contact with each other. The main body 110 and the contact element 121b are connected to each other via the temperature control structure 12. The main body 110 and the contact element 121b, 121c can thus be electrically insulated from each other by an electrically non-conductive temperature control structure 12. The contact element 121b can be made of the same material as the main body 110.

Figures 17A, 17B:
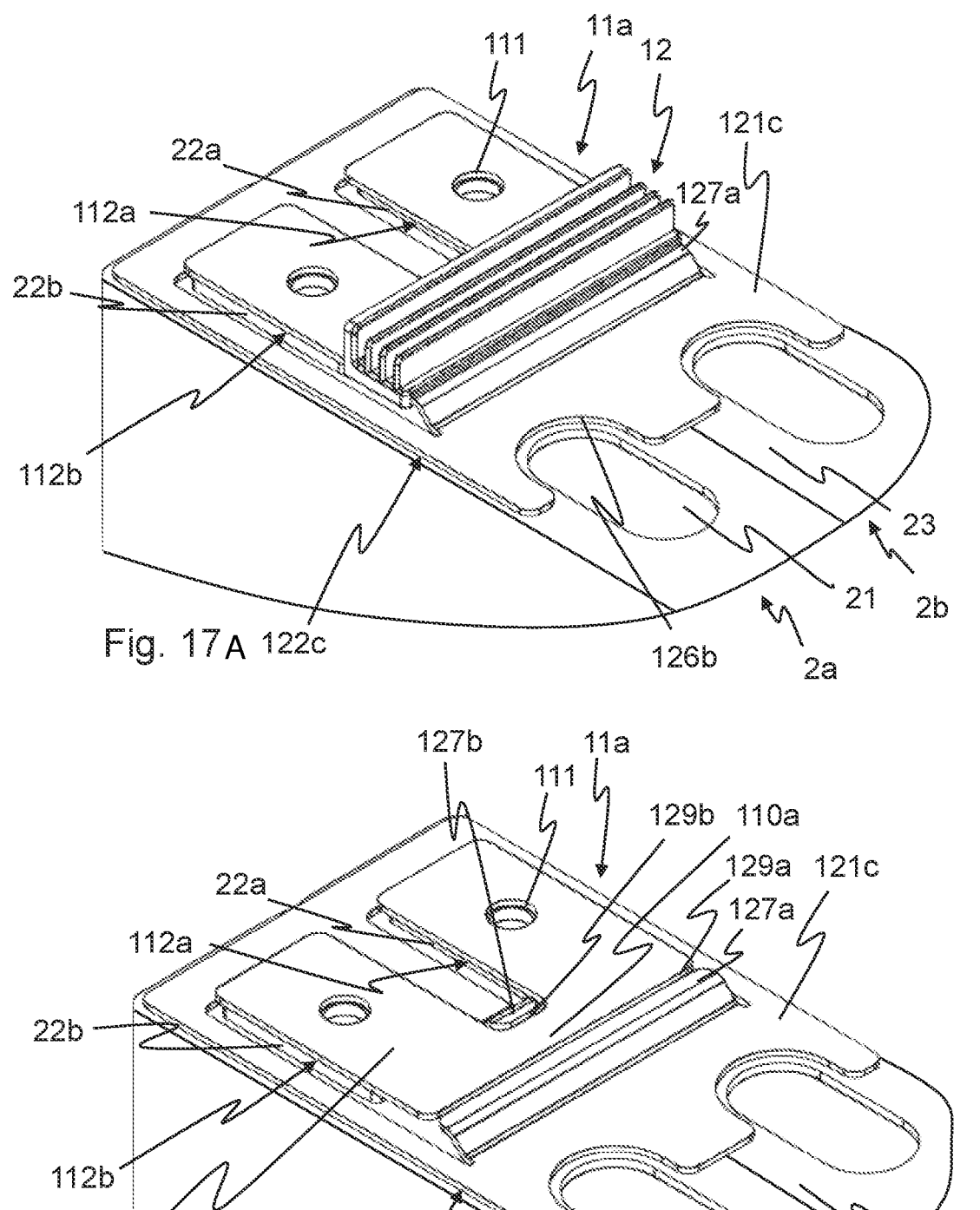
FIG. 17A is a perspective view of a further embodiment of a cell connector.
FIG. 17B shows a perspective view of a further embodiment of a cell connector without a temperature control structure.

The variant of FIGS. 17A and 17B has an additional offset 127b between the two contact faces 112a, 112b. The contact element 121c extends as far as the degassing openings 21 and surrounds the pole contacts 22a, 22b of the energy storage cells 2a, 2b. The additional offset 127b can additionally increase the heat conduction between the contact element 121c and the temperature control structure 12 as well as the mechanical stability of the cell connector 11a.

The offset 127a, 127b can be created, for example, by two folds of a plate shaped raw material, for example a metal sheet, as can be seen in FIG. 17B, in which the temperature control structure has been omitted for illustrative purposes.

The main body 110 and the contact elements 121b, 121c can advantageously be made, for example cut or punched, from a common plate shaped blank.

Corresponding contact elements can also be provided for the terminal cell connectors 11b. The geometry of the contact element for a cell connector 11b can be easily adapted to the geometry of the cell connector 11b.

The cell connectors 11a, 11b can have an interface to a temperature control channel 131 and can be connected to the latter, for example welded or adhesively bonded, preferably in the region of the temperature control structure 12. For this purpose, the through openings 140 of the support structure 13 can be arranged laterally in the direction of the pole contacts and/or in the direction of the degassing channel and/or in the direction of the battery storage cells.

The temperature control structure 12 of the cell connectors can close the through openings 140 of the support structure 13. In addition, the temperature control structure 12 may insulate the base element 110, 113 and/or the contact element 121b, 121c with respect to a temperature control fluid located in the temperature control channel 131. Thus, for example, a fluid consisting of an electrically conductive fluid may be provided. The temperature control structure 12 may likewise insulate the base element 110, 113 and/or the contact element 121b, 121c with respect to the support structure 13. Alternatively, the support element in this variant could, for example, consist of a metal, for example aluminum or an aluminum alloy.

Alternatively, the embodiments of the cell connectors 11a, 11b can also be used without a temperature control channel 131. In this case, the ambient air can be used for temperature control, for example.

The following is a summary list of reference numerals and the corresponding structure used in the above description of the invention:

1 cell contacting system
2a first energy storage cell
2b second energy storage cell
2z last energy storage cell
3 energy storage device
4a circuit board arrangement
4b circuit board arrangement
11a cell connector
11b cell connector
111 through opening
110 main body
113 main body
110a partial region
110d current tap
112a contact face
112b contact face
12 temperature control structure
121a contact element
121b contact element
121c contact element
122a contact face
122b contact face
122c contact face
124a temperature control ribs
124b temperature control wave structure
124c temperature control nubs
124d temperature control pins
124e temperature control bars
127a offset
127b offset
129a gap
129b gap
13 support structure
131 temperature control channel
132 degassing channel 133 protective layer
135 mounting recess
136 fastening and/or centring means
136a spacer
137 first side
138 second side
139 wall
140 through opening
141 through opening
142 recess
15 connection elements
16 open-loop and/or closed-loop control electronics
161a circuit board
161b circuit board
161c circuit board
162 electronic components
162a recess
163a contacting strip
17a temperature sensor arrangement
17b temperature sensor arrangement
171a temperature sensor element
171b temperature sensor element
172a shaped housing element
172b shaped housing element
173a contact element
173b contact element
173c contact element
174a connections
174b connections
175a connection means
175b connection means
176a circuit board
177a spring arm
178a base
178b base
178c step
178d step
179a guide channel
18a additional circuit board
18b additional circuit board
181a sensor element
181b sensor element
182a contacting means
182b contacting means
183a conductor bars
183b conductor bars
184 recesses
19 spacer
191 connection means
21 degassing opening
22a pole contact
22b pole contact
23 upper side
The invention claimed is:

1. A cell contacting system for energy storage cells of an energy storage device, the cell contacting system comprising:

a plurality of cell connectors for electrically contacting pole contacts of the energy storage cells;

at least one degassing channel for discharging gases escaping from the energy storage cells;

at least one temperature control channel for conducting a fluid for controlling a temperature of the energy storage cells and/or said cell connectors;

open-loop and/or closed-loop control electronics for open-loop and/or closed-loop control of the energy storage cells of the energy storage device; and a support structure having said at least one degassing channel and said at least one temperature control channel formed therein, said cell connectors being fixed to said support structure, said support structure being formed as a shaped part and disposed on top side of the energy storage cells, said at least one degassing channel and said at least one temperature control channel are each molded into said support structure.

2. The cell contacting system according to claim 1, wherein the cell contacting system is a module and the cell contacting system is mountable on the energy storage cells of the energy storage device via said cell connectors.

3. The cell contacting system according to claim 1, wherein said support structure only covers the top side of the energy storage cells.

4. The cell contacting system according to claim 1, wherein said at least one degassing channel is configured to be open on a first side of said support structure.

5. The cell contacting system according to claim 1, wherein said support structure has a wall, a side of said wall opposite the energy storge device serving as a mounting base.

6. The cell contacting system according to claim 1, wherein said support structure has a fastening and/or centring means and/or through-openings formed therein.

7. The cell contacting system according to claim 1, wherein an inner side of said at least one degassing channel and/or an underside of said at least one temperature control channel has a protective layer.

8. The cell contacting system according to claim 7, wherein said protective layer is formed of a heat-resistant and/or acid-resistant material.

9. The cell contacting system according to claim 1, wherein said at least one temperature control channel has through-openings formed therein and disposed laterally to its longitudinal axis.

10. The cell contacting system according to claim 3, wherein said at least one degassing channel and said at least one temperature control channel are each molded into said support structure, extend horizontally above the energy storage cells and are open on a side facing said energy storage cells and use an upper surface of the energy storage cells to enclose said open side of said at least one degassing channel and of said at least one temperature control channel.

11. The cell contacting system according to claim 1, wherein said support structure is formed of a material selected from the group consisting of: a plastic, aluminum and an aluminum alloy.

12. The cell contacting system according to claim 1, further comprising a circuit board and/or an additional circuit board having at least one sensor element.

13. The cell contacting system according to claim 12, wherein said circuit board and said additional circuit board have main surfaces disposed vertically offset from each other.

14. The cell contacting system according to claim 12, wherein said at least one sensor element has a thermally conductive contact element via which said at least one sensor element can be contacted with a surface of an energy storage cell.

15. The cell contacting system according to claim 12, further comprising:

connections;

a temperature sensor configuration having at least one temperature sensor element for contacting the energy storage cells of the energy storage device, wherein said at least one temperature sensor element is connected to said circuit board via said connections;

a shaped housing element for supporting said at least one temperature sensor element; and a mechanical connector disposed on said shaped housing element and serving to fix said shaped housing element to said circuit board.

16. The cell contacting system according to claim 15, wherein said mechanical connector forms a snap connection to said circuit board.

17. The cell contacting system according to claim 15, wherein said shaped housing element contains an elastically deflectable spring arm, with which said at least one temperature sensor element in a mounted state is pressed against an upper side of the energy storage device or the energy storage cell.

18. The cell contacting system according to claim 15, further comprising a flexible contact element;

wherein said shaped housing element has a chamber formed therein; and wherein said at least one temperature sensor element is disposed in said chamber, on a side of said shaped housing element facing away from said connections of said at least one temperature sensor element there is disposed said flexible contact element, said flexible contact element is in contact with said at least one temperature sensor element and said at least one temperature sensor element projects beyond said shaped housing element at its end facing away from said connections.

19. The cell contacting system according to claim 1, wherein at least one of said cell connectors has a temperature control structure.

20. An energy storage device, comprising:

a plurality of energy storage cells disposed in a row; and said cell contacting system according to claim 1 connected to said plurality of energy storage cells.

* * * * *